United States Patent [19]

Janiszewski

[11] Patent Number: 4,998,443
[45] Date of Patent: Mar. 12, 1991

[54] CONTROL SYSTEM FOR AUTOMATIC GEARBOXES IN WHICH GEAR CHANGES ARE EFFECTED STEPWISE

[75] Inventor: Grzegorz Janiszewski, Angered, Sweden

[73] Assignee: AB Volvo, Goteborg, Sweden

[21] Appl. No.: 473,966

[22] PCT Filed: Nov. 1, 1988

[86] PCT No.: PCT/SE88/00589
§ 371 Date: Apr. 17, 1990
§ 102(e) Date: Apr. 17, 1990

[87] PCT Pub. No.: WO89/04432
PCT Pub. Date: May 18, 1989

[30] Foreign Application Priority Data

Nov. 2, 1987 [SE] Sweden .................. 8704269

[51] Int. Cl.$^5$ .................. B60K 20/10; F16H 3/08
[52] U.S. Cl. .................. 74/335; 74/356
[58] Field of Search .................. 74/329, 330, 331, 335, 74/356

[56] References Cited

U.S. PATENT DOCUMENTS

| | | | |
|---|---|---|---|
| 3,772,933 | 11/1973 | Prenzel et al. | 74/335 |
| 4,438,666 | 3/1984 | Lane | 74/867 |
| 4,633,987 | 1/1987 | Rögner et al. | 74/335 X |
| 4,637,269 | 1/1987 | Hasegawa et al. | 74/335 |
| 4,660,441 | 4/1987 | Young | 74/868 |
| 4,674,345 | 6/1987 | Furukawa et al. | 74/335 |
| 4,756,213 | 7/1988 | Mainquist et al. | 74/335 X |
| 4,843,902 | 7/1989 | Patton et al. | 74/335 |

FOREIGN PATENT DOCUMENTS 451005 8/1987 Sweden .
85/05427 12/1985 World Int. Prop. O. .

Primary Examiner—Dirk Wright
Attorney, Agent, or Firm—Young & Thompson

[57] ABSTRACT

An electrohydraulic system for controlling the gear changing process in a mechanical, automatic gear-box having five gears. The system includes two pairs of electromagnetic valves (57, 58, and 59, 60) which control via pressure-control valves (61, 62) the flow of pressure medium to three operating cylinders (41, 42, 43). When activated individually, the electromagnetic valves control the engagement of the first, second, third and fourth gears. Simultaneous activation of the electromagnetic valves (58, 57) of the first and third gears will result in engagement of the fifth gear, whereas simultaneous activation of the electromagnetic valves (60, 59) of the second and fourth gears will result in engagement of the reverse gear.

5 Claims, 1 Drawing Sheet

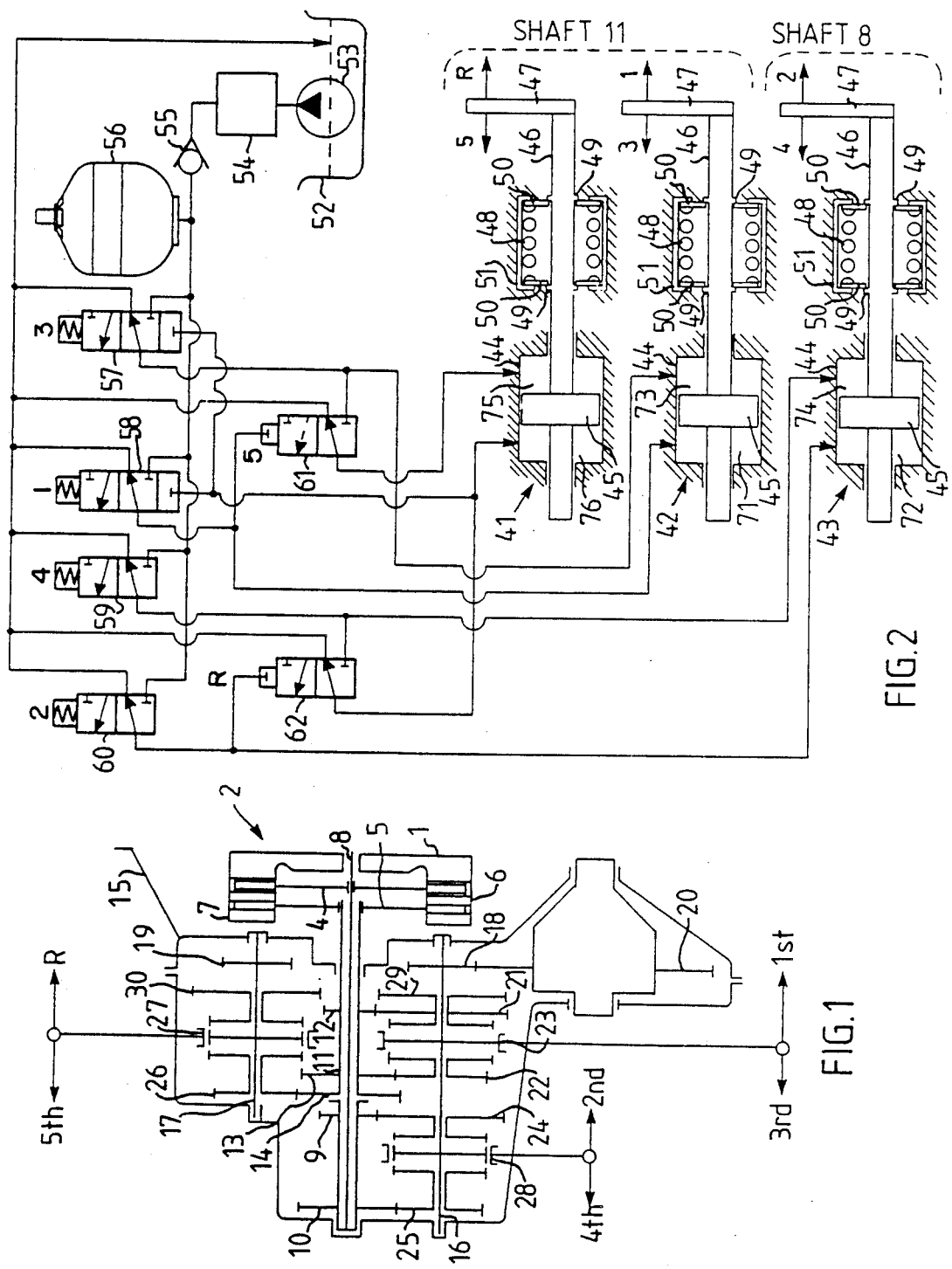

CONTROL SYSTEM FOR AUTOMATIC GEARBOXES IN WHICH GEAR CHANGES ARE EFFECTED STEPWISE

The present invention relates to a system for controlling the gear-changing process in a mechanical, automatic gearbox of the kind having concentrically journalled and alternately driven input shafts, and two intermediate shafts which carry gears which engage with gears on the input shafts, and in which at least one gear in each pair of mutually engaging gears can be disengaged from its respective shaft, including pressure-medium activated piston-cylinder devices for disengaging and engaging said disengageable gear, and a control circuit which includes valve means for regulating the flow of medium to and from the piston-cylinder devices.

Double input shafts and double intermediate shafts are used in gear boxes of the so-called "power shift" type, in which the gear change is effected through preselection, wherein two gear pairs, each driven by a respective input shaft, are engaged simultaneously. Prior to changing form, for instance, first gear to second gear, the gears of the second gear transmission are engaged, whereafter the actual gear change takes place by disengagement of the input shaft of the first gear and engagement of the input shaft of the second gear.

One feature characteristic of this type of gearbox is that they are well suited to automation. For example, the process of gear changing can be controlled by a microcomputer-controlled electro-hydraulic control system, in which electromagnetic valves regulate the supply of working medium to hydraulic cylinders whose pistons are connected to the shift rods in the gearbox. It is necessary to construct such control systems with the aim of minimizing the risk of error in the microcomputer or in the remainder of the electric system, e.g. such errors are those which will result in two gears on and the same shaft, e.g. the disengageable gears of the first and third gear, being engaged simultsaneously. The result of wrongly engaging two gears in this way can have extremely serious consequences, not only in total destruction of the gearbox but also in a direct driving hazard, as a result of braking or locking of the driven vehicle wheels.

The object of the present invention is to provide a control system of the aforedescribed kind which will totally eliminate the risk of simultaneously engaging two disengageable gears on one and the same shaft, irrespective of erroneous control signals from a microcomputer incorporated in the system or of any other fault in the electric system.

This object is achieved generally in accordance with the invention, in that the control circuit includes valve means which are constructed and interconnected such that the supply of pressure medium for engaging a second gear on a shaft which already has a first gear engaged will result in the disengagement of the first engaged gear through a pressure medium control facility.

For instance, in the case of a gearbox having five gears, in which the gear pairs or sets of the first, third and fifth gear, and the reverse gear are each driven by one and the same input shaft, whereas the gear pairs or sets of the second and fourth gear are each driven by the second input shaft, a pair of electromagnetic valves, each of which controls the supply of pressure medium for engagement of the gears of the first and second gear, may be connected to one another and also with further pressure-medium control valve means, in a manner such that activation of the third gear valve while the valve of the first gear is still activated will result in disengagement of the gear wheel of the first gear and engagement of the gear wheel of the fifth gear. By allowing, in this way, two valves of mutually different functions to function jointly to provide an additional function, the risk of simultaneous engagement of two gear wheels on one and the same shaft is totally eliminated.

The invention will now be described in more detail with reference to an exemplifying embodiment illustrated in the accompanying drawing, in which FIG. 1 is a schematic illustration of an inventive gearbox, and FIG. 2 is a circuit diagram of an inventive control system for the gearbox illustrated in FIG. 1.

The reference 1 identifies an engine flywheel which has connected thereto a clutch, generally referenced 2, which includes a first clutch disk 4, a second clutch disk 5, a pressure plate 6 which is non-rotatably connected to the flywheel but axially movable thereon, and a further pressure plate 7 which is rigidly connected to the flywheel. The clutch disk 4 is connected to a first input shaft 8 which carries the gear wheels 9 and 10 of the second and fourth gears, whereas the clutch disk 5 is connected to a second input shaft 11 which is a hollow shaft journalled concentrically with the first shaft 8 and which carries the input gear wheel 12, 13, and 14 of the first, third and fifth gears respectively.

A first and second intermediate shaft 16 and 17 are journalled in the gearbox housing 15 on respective opposite sides of the input shafts 8, 11 and extend in a plane on one side of the input shafts. Each of the intermediate shafts 16, 17 have non-rotatably attached thereto a respective gear wheel 18 and 19 which engage the crown wheel 20 of a differential, the housing of which forms part of the actual gearbox housing 15.

The intermediate shaft 16 carries a pair of freely rotatable gear wheels 21 and 22 which engage the gear wheels 12 and 13 of the first and third gear respectively on the input shaft 11 and which can be alternately locked on the shaft, by means of an axially displaceable coupling sleeve 23 which is non-rotatable relative to the shaft. The intermediate shaft 16 also carries free rotatable gear wheels 24 and 25, which engage the gear wheels 9 and 10 of the second and fourth gears respectively on the input shaft 8. The intermediate shaft 17 carries a correspondingly freely rotatable gear wheel 26 which engages the gear wheel 14 of the fifth gear on the second input shaft 11, and a freely rotatable gear wheel 30 which is intended for the reverse gear and which engages a gear wheel 29 on the second input shaft 16. Respective gear wheels 24, 25 or 26, 30 can be locked on the shaft with the aid of two axially displaceable coupling sleeves 27 and 28 which are non-rotatable relative to the shaft. The first-gear gear wheel 21 on the intermediate shaft 16 is provided with a hub on which the gear wheel 30 is non-rotatably mounted.

When driving in first gear, the movable pressure plate 6 will urge the clutch disk 5 against the fixed pressure plate 7, thereby driving the input shaft 11, whereas the input shaft 8 is disengaged. The torque is transmitted from the gear wheel 12 to the crown wheel 20, via the gear wheel 21 locked on the intermediate shaft 16 and the gear wheel 18.

Prior to changing up to the second gear, a preselection is made by locking the second-gear gear wheel 24 and the intermediate shaft 16 with the aid of the coupling sleeve 28, whereafter the actual gear shift is made by movement of the movable pressure plate to the right in FIG. 1, so as to disengage the flywheel 1. Continued gear changes are effected in a corresponding manner, by alternate engagement and disengagement of the two clutch parts.

When engaging the reverse gear, the reverse-gear gear wheel 30 is locked on the shaft 17 and the clutch disk 5 is pressed firmly between the movable and the fixed pressure plates 6 and 7. The torque is now transmitted from the gear wheel 12 to the gear wheel 30, via the first-gear wheel 21 and the reverse-gear gear wheel 29, the direction of rotation of said gear wheel 30 now being opposite to its normal direction of rotation, so that the crown wheel 20 will be driven in an opposite direction for reversing of the vehicle.

FIG. 2 is a circuit diagram of an electro-hydraulic system for controlling the gear changing process in the gearbox illustrated in FIG. 1.

The system includes three operational devices 41, 42 and 43, each comprising a hydraulic piston-cylinder arrangement, including cylinder 44, piston 45, operating rod 46 and shift fork 47. A return spring 48 is mounted between two plates 50 which engage respective abutments 49 in a cylinder 51, said spring striving to set the rods 46 to the position illustrated in the Figure, in which position respective pistons 45 are located centrally in their respective cylinders. All of the coupling sleeves 23, 27, 28 will now occupy a neutral position, in which all disengageable gear wheels are disengaged. The arrows shown in FIG. 2 in connection with respective shift forks 47 illustrate the engaging direction of the different gears.

The system also includes a tank 52, a pump 53, a pressure regulating valve 54, a non-return valve 55 and a pressure accumulator 56, a first pair of electromagnetic valves 57, 58, a second pair of electromagnetic 59, 60, and a pair of pressure-controlled valves 61, 62. The valves 57-62 are marked with the gear which is engaged when activating the valve concerned.

The method of operation is as follows:

A supply of current to each of the valves 58, 60, 57 and 59 singly in said order will result in the sequential engagement of the gear wheels of the first, second, third and fourth gears, as a result of delivery of pressure medium to each of the cylinder spaces 71-74 of the operational devices in sequence. When the valve 58 for the first gear is activated, the valve 61 will be under pressure on the operating side, which means that this valve is open and that the cylinder space 71 of the operational device 42 is under pressure. If the valve 57 for the third gear is now activated, the cylinder space 74 of the operational device 42 will also be placed under pressure. When mutually the same pressure prevails in the cylinder spaces 71 and 73, the return spring 48 will adjust the shift rod 46 to its neutral position, so that both gear wheels 21, 22 (FIG. 1) are disengaged. At the same time, pressure medium is delivered to the cylinder space 75 of the operational device 41, via the valve 61, which causes the fifth gear to be engaged. Analogously, when the valves 60, 59 for the second and fourth gears are activated simultaneously, both of the cylinder spaces 72, 74 of the operating device 43 will be placed under pressure, therewith bringing the device 43 to its neutral position. At the same time, pressure medium is delivered to the cylinder space 76 of the operating device 41, via the valve 62 opened by the valve 60, so as to engage the reverse gear. The valves 57, 58 may also have the form of pressure controlled latching valves and communicate, on their operating sides, with the pressure side of the valve 59, through the valve 62. When the valve 62 is open, the valves 57, 58 are latched in their closed positions, thereby making it impossible to engage the disengageable gear wheels of the first, third or fifth gears.

Because the described system utilizes pairs of valves which each have their separate function when activated individually but which provide a third function when activated together, the risk of unintentional simultaneous activation of two valves is totally eliminated, such unintentional activation of said valves being caused, for instance, by a computer error or some other fault in the electric circuit controlling the electromagnetic valves such as to result in the engagement of two gears driven by one and the same shaft. In addition to this advantage, a further advantage is that the inventive system provides a solution with only a few components.

I claim:

1. A system for controlling the gear changing process in a mechanical, step-change automatic gearbox of the kind having two inputs shafts arranged to be driven alternately, and two intermediate shafts which carry gear wheels in engagement with gear wheels on the input shafts, and in which system at least one gear wheel of each pair of mutually engaging gear wheels can be disengaged from its respective shaft, and said system further including pressure-medium activated piston-cylinder devices for engaging and disengaging said disengageable gear wheels, and a control circuit including valve means for regulating the flow of working medium to and from the piston-cylinder devices, characterized in that the control circuit includes at least two valve means (57, 58; 59, 60) one of which when activated causing engagement of only first disengageable gear wheel (21; 24), the other one when activated causing engagement of only a second disengageable gear wheel (22; 25), said valve means when activated through causing said first and second gear wheel to be disengaged and a third gear wheel (26; 30) to be engaged.

2. A control system according to claim 1 in the case of a gearbox having forward drive gears and a reverse gear, characterized in that the control circuit includes two pairs of valve means (58; 57; 59, 60); in that the valve means (58, 57) of one pair when activated individually engage a disengageable gear wheel (21, 22) for the first and the second gears, whereas when activated together said valve means disengage said gear wheels and engage a disengageable gear wheel (26) for the fifth gear; and in that the valve means (60, 59) of the second pair when activated individually engage a disengageable gear wheel (24, 25) for the second and fourth gear respectively, whereas when activated together said pair of valve means disengage said gear wheels and engage a disengageable gear wheel (24/30) for the reverse gear.

3. A control system according to claim 1 characterized in that said piston-cylinder devices (41, 42, 43) include a cylinder (44) and a piston (45) which is spring biased towards a neutral position in which a cylinder space (71, 76) is located on each side of the piston; in that activation of one valve means in a pair of valve means will result in the supply of pressure medium to one cylinder space in said cylinder, whereas activation in the supply of pressure medium to the opposite cylinder device in the same cylinder and to a cylinder space in another corresponding cylinder having a piston arranged therein.

4. A control system according to claim 1, characterized in that the one valve (58, 60) in respective pairs of valves has a pressure side which is connected to the operating side of a pressure controlled valve (61, 62) and to one cylinder space (71, 72) of a piston-cylinder device (42, 43), whereas the other valve (57, 59) of said valve pair has a pressure side which is connected to the other cylinder space (73, 74) of said piston-cylinder device and also, via said pressure control valve (61, 62) to one cylinder space (75, 76) in another piston-cylinder device (41).

5. A control system according to claim 4, characterized in that the valve (57, 58) of one valve pair have a latching function and are latched in a closed position, via one of said pressure-control valves (62), by the pressure in the cylinder (76) which is under pressure when the reverse gear is engaged.

* * * * *